(12) United States Patent
Yamashiro (10) Patent No.: US 8,370,670 B2
(45) Date of Patent: Feb. 5, 2013

(54) ELECTRONIC APPARATUS AND STORAGE MEDIUM

(75) Inventor: Toshihiro Yamashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 979 days.

(21) Appl. No.: 12/396,854

(22) Filed: Mar. 3, 2009

(65) Prior Publication Data

US 2009/0235103 A1 Sep. 17, 2009

(30) Foreign Application Priority Data

Mar. 14, 2008 (JP) ................................. 2008-065594

(51) Int. Cl.
*G06F 1/32* (2006.01)
*G06F 1/00* (2006.01)

(52) U.S. Cl. ........................................ 713/324; 713/300

(58) Field of Classification Search ................ 713/324, 713/300

See application file for complete search history.

(56) References Cited

U.S. PATENT DOCUMENTS

| | | | | |
|---|---|---|---|---|
| 6,026,494 A * | 2/2000 | Foster | ........................... | 713/320 |
| 6,442,734 B1 * | 8/2002 | Hanson et al. | ................ | 716/136 |
| 6,714,724 B1 * | 3/2004 | Cook | ........................... | 386/224 |
| 6,836,814 B2 * | 12/2004 | Takaoka et al. | ............... | 710/316 |
| 7,593,044 B2 * | 9/2009 | Koike | ........................... | 348/231.2 |
| 7,904,739 B2 * | 3/2011 | Larson | .......................... | 713/323 |
| 2003/0155420 A1 * | 8/2003 | Morrow et al. | .............. | 235/449 |
| 2004/0215983 A1 * | 10/2004 | Kwahk et al. | ................. | 713/300 |
| 2006/0031692 A1 * | 2/2006 | Kato et al. | .................... | 713/300 |
| 2007/0081504 A1 * | 4/2007 | Shih et al. | .................... | 370/338 |
| 2008/0016380 A1 * | 1/2008 | Stufflebeam | .................. | 713/320 |
| 2009/0002757 A1 * | 1/2009 | Kitahara et al. | ............. | 358/1.15 |
| 2009/0187780 A1 * | 7/2009 | Keohane et al. | ............. | 713/324 |
| 2009/0204837 A1 * | 8/2009 | Raval et al. | .................... | 713/330 |

FOREIGN PATENT DOCUMENTS

| | | |
|---|---|---|
| JP | 4-68959 | 3/1992 |
| JP | 10-268713 | 10/1998 |
| JP | 11-305880 | 11/1999 |
| JP | 2002-73311 | 3/2002 |
| JP | 2006-027006 | 2/2006 |
| JP | 2006-198795 | 8/2006 |

OTHER PUBLICATIONS

Office Action issued Dec. 6, 2011, in Japanese Patent Application No. 2008-065594.

* cited by examiner

*Primary Examiner* — Paul R Myers
*Assistant Examiner* — Christopher A Daley
(74) *Attorney, Agent, or Firm* — Oblon, Spivak, McClelland, Maier & Neustadt, L.L.P.

(57) ABSTRACT

A disclosed electronic apparatus includes a first communication unit for connecting the electronic apparatus and an external device; a second communication unit for connecting the electronic apparatus and other external devices via a network; a first detection unit for detecting a connection status of the first communication unit; a second detection unit for detecting a connection status of the second communication unit; and a power control unit for controlling power to the electronic apparatus. The first detection unit determines the connection status of the first communication unit when the electronic apparatus is turned on. The power control unit monitors the connection statuses of the first and second communication units via the first and second detection units after a connection to the first communication unit is detected and keeps the electronic apparatus turned on while a connection to at least one of the first and second communication units is detected.

14 Claims, 6 Drawing Sheets

ELECTRONIC APPARATUS AND STORAGE MEDIUM

BACKGROUND OF THE INVENTION

1. Field of the Invention

A certain aspect of the present invention relates to an electronic apparatus and a storage medium containing program code.

2. Description of the Related Art

Universal serial bus (USB) interfaces are widely used to connect electronic apparatuses such as an image forming apparatus and host devices (external devices). Meanwhile, there is a known technology to monitor whether a host device is connected to a USB interface of an image forming apparatus and to turn off the power of the image forming apparatus or one or more modules of the image forming apparatus when no host device is connected to the USB interface.

For example, patent document 1 discloses a USB device including a detection unit for detecting a supply voltage from a host device and controlling power supply to components of the USB device based on the detection result to reduce power consumption of the USB device while it is not being used. If no supply voltage from the host device is detected, the detection unit turns off or reduces power supplied to the components of the USB device.

If no host device is connected to the USB interface of an image forming apparatus, no print request is sent to the image forming apparatus via the USB interface. In other words, it may mean that the image forming apparatus is not in use and the power of the image forming apparatus can be turned off. Automatically turning off the power to an image forming apparatus when it is not in use makes it possible to reduce power consumption and to save the user the trouble of having to press the power button of the image forming apparatus.

Meanwhile, networks such as a LAN are also widely used to connect image forming apparatuses and host devices. For this reason, an image forming apparatus normally includes multiple communication interfaces. Here, if the power of an image forming apparatus including a USB interface and other communication interfaces is automatically turned off as described above just because no host device is connected to the USB interface, host devices connected to the image forming apparatus via the other communication interfaces become unable to use the image forming apparatus. For example, if the power of an image forming apparatus connected to a first host device via a USB interface and to other host devices via a network is turned off when the first host device is disconnected, the other host devices become unable to use the image forming apparatus.

[Patent document 1] Japanese Patent Application Publication No. 11-305880

SUMMARY OF THE INVENTION

Aspects of the present invention provide an electronic apparatus and a storage medium containing program code for causing the electronic apparatus to perform a power control method that solve or reduce one or more problems caused by the limitations and disadvantages of the related art.

According to an aspect of the present invention, an electronic apparatus includes a first communication unit configured to connect the electronic apparatus and an external device in a one-to-one relationship for data communications; a second communication unit configured to connect the electronic apparatus and one or more other external devices via a network for data communications; a first detection unit configured to detect a connection status of the first communication unit; a second detection unit configured to detect a connection status of the second communication unit; and a power control unit configured to control power to the electronic apparatus. The first detection unit is configured to determine the connection status of the first communication unit when the electronic apparatus is turned on. The power control unit is configured to monitor the connection statuses of the first communication unit and the second communication unit via the first detection unit and the second detection unit after the first detection unit detects a connection to the first communication unit and to keep the electronic apparatus turned on while a connection to at least one of the first communication unit and the second communication unit is detected.

Another aspect of the present invention provides a storage medium containing program code for causing an electronic apparatus to perform a power control method. The electronic apparatus includes a first communication unit configured to connect the electronic apparatus and an external device in a one-to-one relationship for data communications; a second communication unit configured to connect the electronic apparatus and one or more other external devices via a network for data communications; a first detection unit configured to detect a connection status of the first communication unit; a second detection unit configured to detect a connection status of the second communication unit; and a power control unit configured to control power to the electronic apparatus. The power control method includes the steps of determining, by the first detection unit, the connection status of the first communication unit when the electronic apparatus is turned on; monitoring, by the power control unit, the connection statuses of the first communication unit and the second communication unit via the first detection unit and the second detection unit after a connection to the first communication unit is detected by the first detection unit; and keeping, by the power control unit, the electronic apparatus turned on while a connection to at least one of the first communication unit and the second communication unit is detected.

DESCRIPTION OF THE PREFERRED EMBODIMENTS

Preferred embodiments of the present invention are described below with reference to the accompanying drawings.

First, an inkjet recording apparatus (image forming apparatus) is described as an example of an electronic apparatus according to an embodiment of the present invention.

Figure 1:
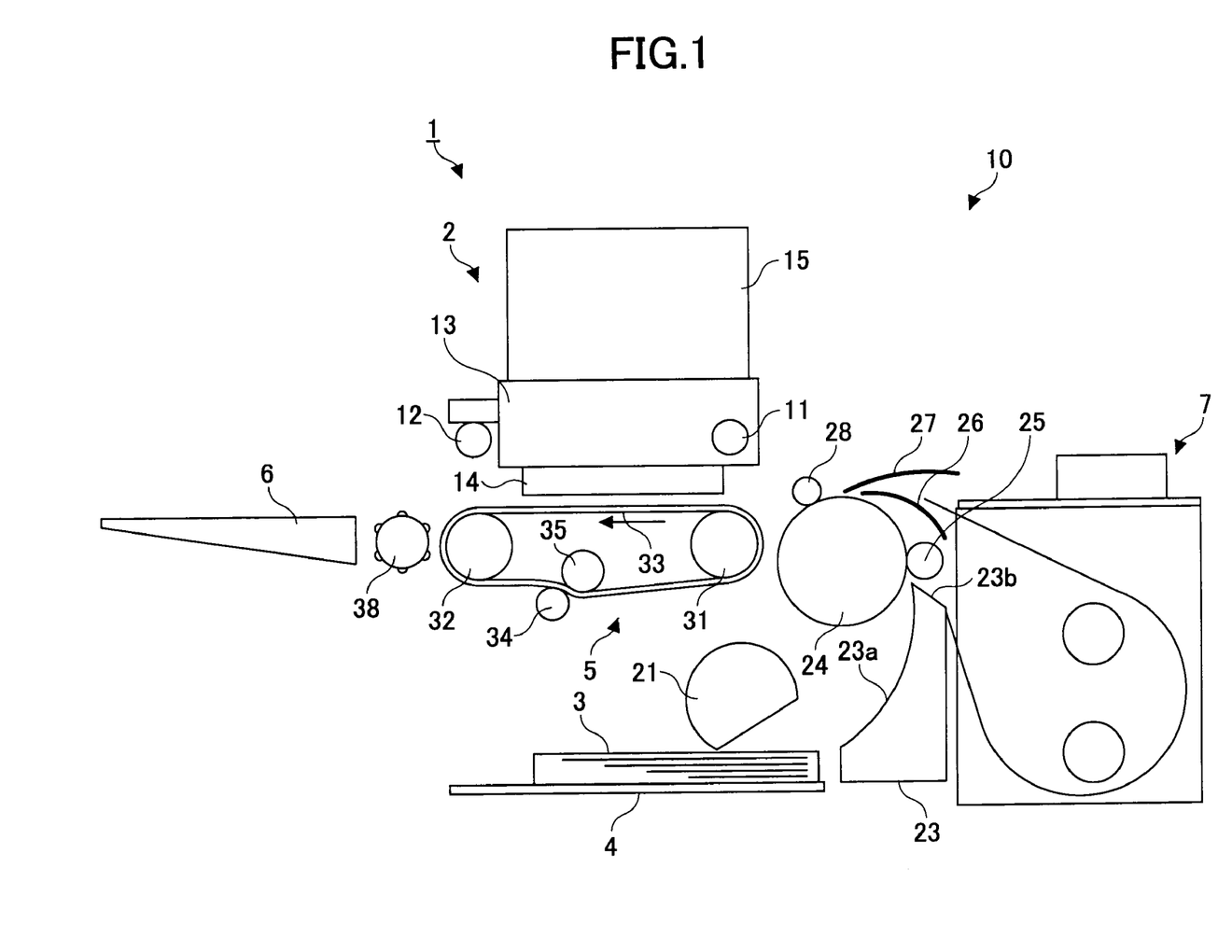
FIG. 1 is a schematic diagram illustrating a configuration of an inkjet recording apparatus according to an embodiment of the present invention.

FIG. 1 is a schematic diagram of an inkjet recording apparatus 10. The inkjet recording apparatus 10 includes a main unit 1 including an image forming unit 2, and a paper-feed tray 4 disposed below the main unit 1 and capable of holding multiple recording media 3 (hereafter called paper 3). The paper 3 is fed from the paper-feed tray 4 into a conveying mechanism 5. The image forming unit 2 forms an image on the paper 3 being conveyed by the conveying mechanism 5. After the image is formed, the paper 3 is ejected onto a paper-catch tray 6 attached to a side of the main unit 1.

The inkjet recording apparatus 10 also includes a duplex unit 7 detachably attached to the main unit 1. When images are to be formed on both sides of the paper 3, the paper 3 is conveyed in the reverse direction by the conveying mechanism 5 into the duplex unit 7 after an image is formed on one side (front side) of the paper 3. The duplex unit 7 turns the paper 3 upside down so that the other side (back side) of the paper 3 faces upward and feeds the paper 3 again into the conveying mechanism 5. After an image is formed on the back side, the paper 3 is ejected onto the paper-catch tray 6.

The image forming unit 2 includes a carriage 13 slidably attached to guide shafts 11 and 12. The carriage 13 is moved by a main-scanning motor (not shown) in a direction (main-scanning direction) orthogonal to the conveying direction of the paper 3. The carriage 13 includes recording heads 14 that are liquid-jet heads each having an array of nozzle holes for jetting liquid droplets. Ink cartridges 15 are detachably attached to the recording heads 14 to supply liquids to the recording heads 14. Alternatively, recording head tanks may be attached to the recording heads 14 instead of the ink cartridges 15. In this case, liquids (or inks) are supplied to the recording head tanks from main tanks.

In this embodiment, it is assumed that the recording heads 14 are provided for yellow (y), magenta (m), cyan (c), and black (k) inks. Alternatively, one or more recording heads having arrays of nozzle holes corresponding to the color inks may be used. The number and order of colors are not limited to those mentioned above.

Each of the recording heads 14, for example, includes an energy-generating unit for generating energy to jet ink droplets. Examples of the energy-generating unit include a piezoelectric actuator such as a piezoelectric element, a thermal actuator employing liquid phase change resulting from film boiling caused by an electrothermal converting element such as a heating element, a shape memory alloy actuator employing metal phase change caused by a temperature change, or an electrostatic actuator employing static electricity.

Sheets of the paper 3 in the paper-feed tray 4 are separated one by one by a paper-feed roller (crescent roller) 21 and a separating pad (not shown) and fed into the conveying mechanism 5 of the main unit 1.

The conveying mechanism 5 includes a conveying guide 23 for guiding the paper 3 fed from the paper-feed tray 4 in an upward direction along a guide surface 23a and guiding the paper 3 fed from the duplex unit 7 along a guide surface 23b; a conveying roller 24 for conveying the paper 3; a pressing roller 25 for pressing the paper 3 against the conveying roller 24; a guide part 26 for guiding the paper 3 to the conveying roller 24; a guide part 27 for guiding the paper 3 returned during duplex printing to the duplex unit 7; and a pressing roller 28 for holding down the paper 3 fed from the conveying roller 24.

The conveying mechanism 5 also includes a conveyor belt 33 that is stretched between a drive roller 31 and a driven roller 32 and configured to convey the paper 3 on a flat surface under the recording heads 14; a charging roller 34 for charging the conveyor belt 33; a guide roller 35 facing the charging roller 34; a guide part (platen) (not shown) for guiding the conveyor belt at a position facing the image forming unit 2; and a cleaning roller (cleaning unit) (not shown) made of, for example, a porous body for removing a recording liquid (ink) adhering to the conveyor belt.

The conveyor belt 33 is an endless belt and is stretched between the drive roller 31 and the driven roller (tension roller) 32. The conveyor belt 33 rotates in the direction of an arrow (paper conveying direction) shown in FIG. 1.

The conveyor belt 33 may be composed of any number of layers. For example, the conveyor belt 33 may include a front layer (paper-attracting surface) that attracts the paper 3 and a back layer. The front layer may be made of a pure resin material, such as an ethylene-tetrafluoroethylene (ETFE) pure material, that is not resistance-adjusted and has a thickness of about 40 μm. The back layer (medium-resistance layer or earth layer) may be made of a material prepared by adjusting, with carbon, the resistance of the same material as that used for the front layer.

The charging roller 34 is disposed so as to contact the front layer of the conveyor belt 33 and is configured to rotate according to the rotation of the conveyor belt 33. A high voltage is applied in a predetermined pattern from a high-voltage circuit (high-voltage power supply) (not shown) to the charging roller 34.

The inkjet recording apparatus 10 further includes a paper-eject roller 38 disposed downstream of the conveying mechanism 5. The paper-eject roller 38 ejects the paper 3 onto the paper-catch tray 6 after an image is formed on the paper 3.

In the inkjet recording apparatus 10 configured as described above, the conveyor belt 33 is rotated in the direction indicated by the arrow and is charged by the contacting charging roller 34 to which a high voltage is applied. The polarity of the voltage applied to the charging roller 34 is switched at predetermined intervals and therefore the conveyor belt 33 is charged at a predetermined charging pitch.

When the paper 3 is placed on the charged conveyor belt 33, the paper 3 is internally polarized and electric charges having opposite polarity to that of electric charges on the conveyor belt 33 are attracted to a side of the paper 3 contacting the conveyor belt 33. As a result, the electric charges on the conveyor belt 33 and the electric charges on the paper 3 are electrostatically attracted to each other and the paper 3 is attracted to the conveyor belt 33. Thus, the paper 3 is strongly attracted to the conveyor belt 33 and the surface of the paper 3 having warpage and bumps is substantially flattened.

The conveyor belt 33 is rotated to move the paper 3 and the recording heads 14 are driven according to an image signal while moving the carriage 13 in one or both directions. Liquid droplets (or ink droplets) are jetted from the recording heads 14 onto the paper 3 that is temporarily stopped to form one line of an image by dots of the liquid droplets. Then, the paper 3 is moved a predetermined distance to form the next line. When a recording end signal or a signal indicating that the rear edge of the paper 3 has reached the recording area is received, the recording process is terminated.

The paper 3 with the formed image is ejected by the paper-eject roller 38 onto the paper-catch tray 6.

Figure 2:
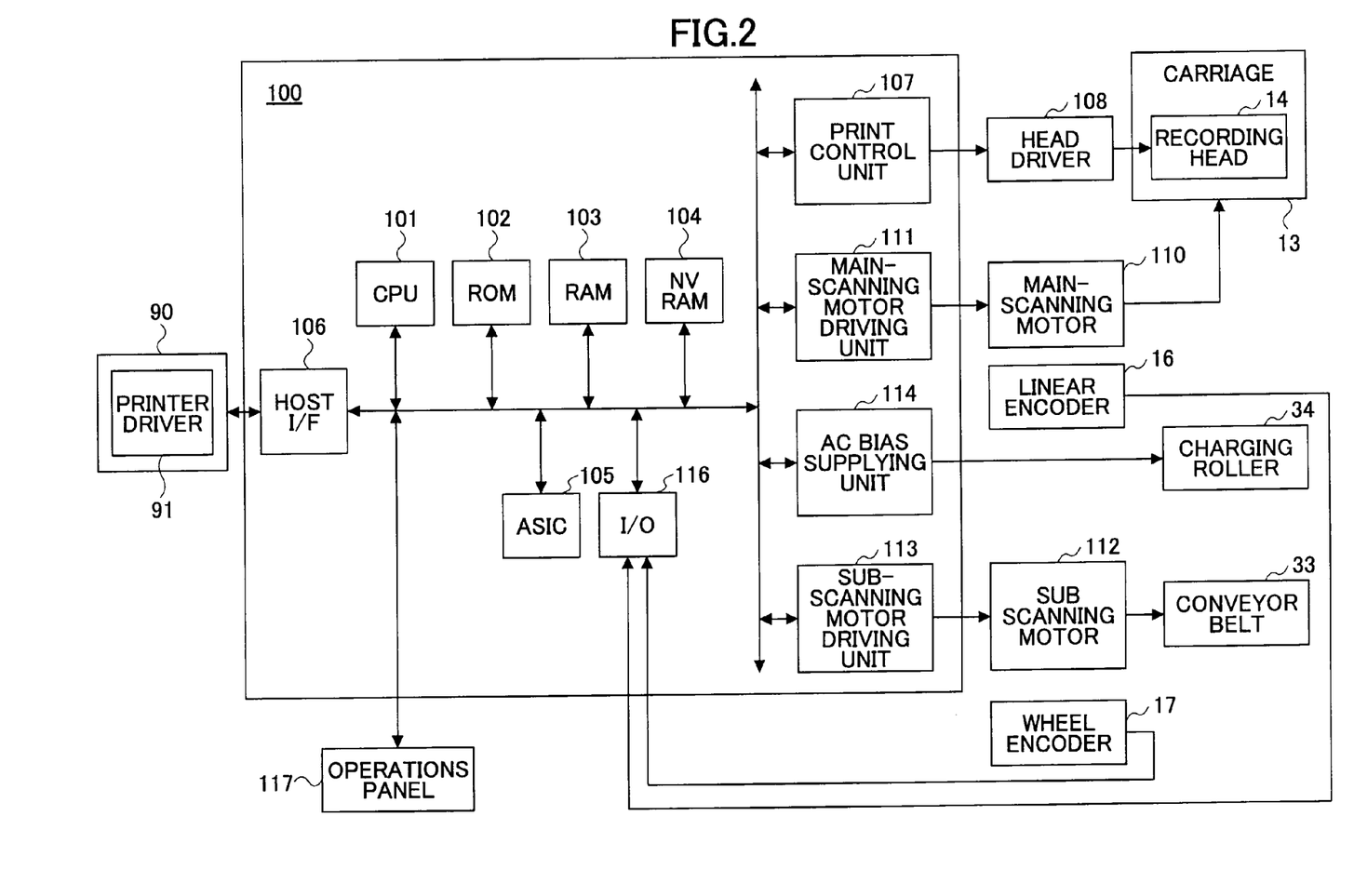
FIG. 2 is a block diagram illustrating a control unit of the inkjet recording apparatus shown in FIG. 1.

Next, a control unit 100 of the inkjet recording apparatus 10 is described with reference to a block diagram shown in FIG. 2.

The control unit 100 includes a CPU 101 that controls the movement of the paper 3 and the recording heads 14 and also controls other components of the inkjet recording apparatus 10; a ROM 102 for storing programs to be executed by the CPU 101 and other fixed data; a RAM 103 for temporarily storing image data; a non-volatile memory (NVRAM) 104 that retains data even when the power is turned off; and an ASIC 105 that performs, for example, signal processing, image processing such as sorting, and processing on input/output signals for controlling the inkjet recording apparatus 10.

The control unit 100 also includes a host I/F 106 for sending and receiving signals to and from hosts 90 (may be referred to in the singular or the plural for descriptive purposes) each of which is a data processing apparatus (e.g., a personal computer) including a printer driver 91; a print control unit 107 that generates a drive waveform for driving the recording heads 14 and outputs image data and accompanying data for selectively driving pressure generators of the recording heads 14 to a head driver 108; a main-scanning motor driving unit 111 for driving a main-scanning motor 110; a sub-scanning motor driving unit 113 for driving a sub-scanning motor 112; an AC bias supplying unit 114 for supplying an AC bias to the charging roller 34; and an I/O unit 116 for receiving detection pulses from a linear encoder 16 and a wheel encoder 17 and other detection signals from various sensors.

An operations panel 117 for inputting and displaying information is connected to the control unit 100. The control unit 100 also turns on and off the AC bias supplying unit 114 for supplying a high voltage to the charging roller 34 and switches the polarity of the voltage.

The host I/F 106 of the control unit 100 receives print data including image data via a cable or a network from the host 90. The host 90 represents, for example, a data processing apparatus such as a personal computer, an image reading apparatus such as an image scanner, or an imaging apparatus such as a digital camera. The printer driver 91 of the host 90 generates print data and outputs the generated print data to the control unit 100.

The CPU 101 reads and analyzes print data in a receive buffer of the host I/F 106, causes the ASIC 105 to process (e.g., to sort) the print data, and transfers the print data to the print control unit 107. The print control unit 107 sends image data and a drive waveform to the head driver 108 at appropriate timings. Dot pattern data used to output an image may be generated by the control unit 100 based on font data stored, for example, in the ROM 102. Alternatively, image data may be converted into bitmap data by the printer driver 91 of the host 90 and sent to the inkjet recording apparatus 10. In this embodiment, it is assumed that image data are converted into bitmap data by the printer driver 91.

The print control unit 107 includes a drive waveform generating unit (not shown) including an amplifier and a D/A converter for converting, from digital to analog, drive pulse pattern data retrieved by the CPU 101 from the ROM 102. The drive waveform generating unit sends a drive waveform composed of one or more drive pulses to the head driver 108.

The head driver 108 selectively applies the drive pulses constituting the drive waveform supplied from the drive waveform generating unit of the print control unit 107 to the pressure generators of the recording heads 14 according to one line of image data (dot pattern data) that are input serially, and thereby drives the recording heads 14. The head driver 108, for example, includes a shift register for storing a clock signal and serial data (image data), a latch circuit for latching a register value of the shift register according to a latch signal, a level conversion circuit (level shifter) for changing the level of an output value from the latch circuit, and an analog switch array (switching unit) that is turned on and off by the level shifter. The head driver 108 selectively applies drive pulses in a drive waveform to the pressure generators of the recording heads 14 by turning on and off the analog switch array to drive the recording heads 14.

The host I/F 106 includes a first communication unit (first communication interface) (not shown) for connecting the inkjet recording apparatus 10 and an external device (host 90) in a one-to-one relationship to enable wired or wireless data communications and a second communication unit (second communication interface) (not shown) for connecting the inkjet recording apparatus 10 and one or more external devices (hosts 90) via a network in a one-to-many relationship to enable wired or wireless data communications.

The host I/F 106 may support various data communication standards. For example, the first communication unit may support a wired data communication standard such as USB, IEEE 1394, or external serial ATA (eSATA). A communication interface conforming to such a data communication standard typically includes a power supply line for supplying power from an external device (host 90) and supports plug-and-play (a mechanism for automatically configuring a connected device by collaboration of hardware, firmware, a driver, an operating system, and an application) and hot swap (a mechanism that allows to pull out and plug in a device while the main power is on). Alternatively, the first communication unit may support a wireless data communication standard such as IrDA (infrared data communication), WirelessUSB, or Bluetooth. The second communication unit may support Ethernet (registered trademark), a wireless LAN (e.g., IEEE 802.11a/b/g/n), or power line communication (PLC).

The control unit 100 includes a first detection unit (not shown) for detecting the connection status of the first communication unit, a second detection unit (not shown) for detecting the connection status of the second communication unit, and a power control unit (not shown) for turning on and off (i.e., controlling) power to components of the inkjet recording apparatus 10.

The first detection unit, for example, detects the connection status of a USB interface based on the voltage of a VBUS signal of a VBUS used to supply power from a host device. If the VBUS signal is low, it may indicate that no USB cable is connected to the USB interface or the host 90 is turned off. In either case, the first detection unit determines that no host 90 is connected.

The second detection unit detects, for example, the connection status of an Ethernet (registered trademark) interface based on whether a link is established. If no link is established, it may indicate that no LAN cable is connected, the hosts 90 are turned off, or there is a communication problem. In any case, the second detection unit determines that no host 90 is connected.

Similarly, it is possible to detect the connection status of a communication interface supporting any other standard by determining whether a connection is established according to the corresponding protocol. For example, the connection status of a Bluetooth interface may be detected based on whether a pairing is established, and the connection status of a wireless LAN interface or a PLC interface may be detected based on whether a link is established as in the case of an Ethernet (registered trademark) interface.

Figure 3:
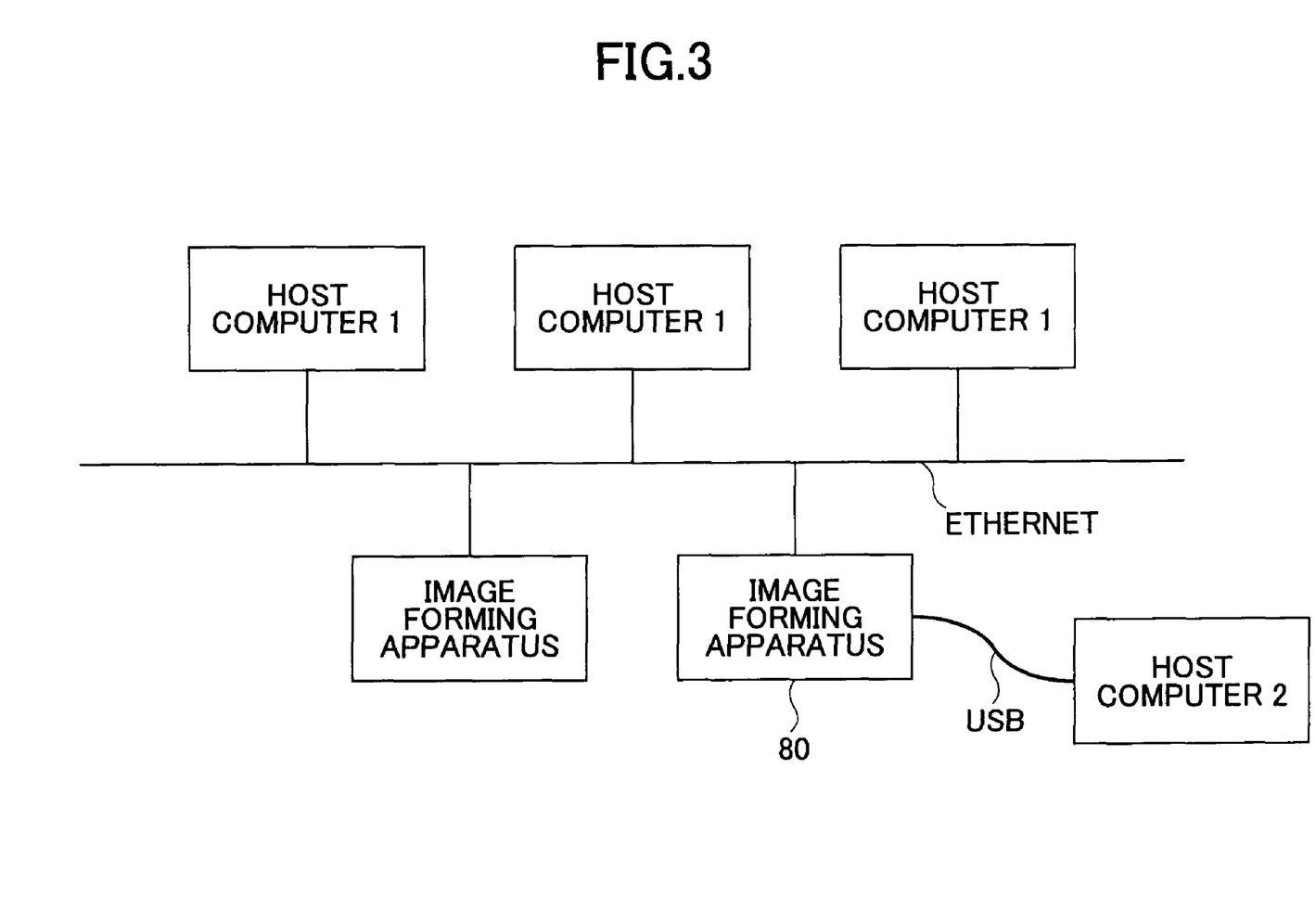
FIG. 3 is a drawing illustrating an exemplary connection topology of an image forming apparatus and host devices.

FIG. 3 is a drawing illustrating an exemplary connection topology of an image forming apparatus and host devices.

In FIG. 3, an image forming apparatus 80 is connected to a network via an Ethernet (registered trademark) interface and multiple host computers 1 are connected to the same network. Also a host computer 2 is connected via a USB interface to the image forming apparatus 80. Thus, the image forming apparatus 80 includes multiple communication interfaces and can be connected to multiple host devices.

If the image forming apparatus 80 is connected via the USB interface only to the host computer 2 that is normally located close to the image forming apparatus 80, turning off the power of the image forming apparatus 80 when it is not being used by the user of the host computer 2 may not cause any inconvenience to other users. However, if the image forming apparatus 80 is also connected via a network to multiple host computers 1 that are often located away from the image forming apparatus 80 and if its power is turned off when not being used by the user of the host computer 2, the users of the host computers 1 have to come to the location where the image forming apparatus 80 is installed and check its status. Although it is assumed that an Ethernet (registered trademark) LAN is used in the example shown in FIG. 3, the above descriptions may also apply to other types of networks such as a wireless LAN or a PLC network. Also, the above descriptions may apply to a case where an interface other than USB such as IEEE 1394, WirelessUSB, IrDA, or Bluetooth is used as the first communication unit.

Figure 4:
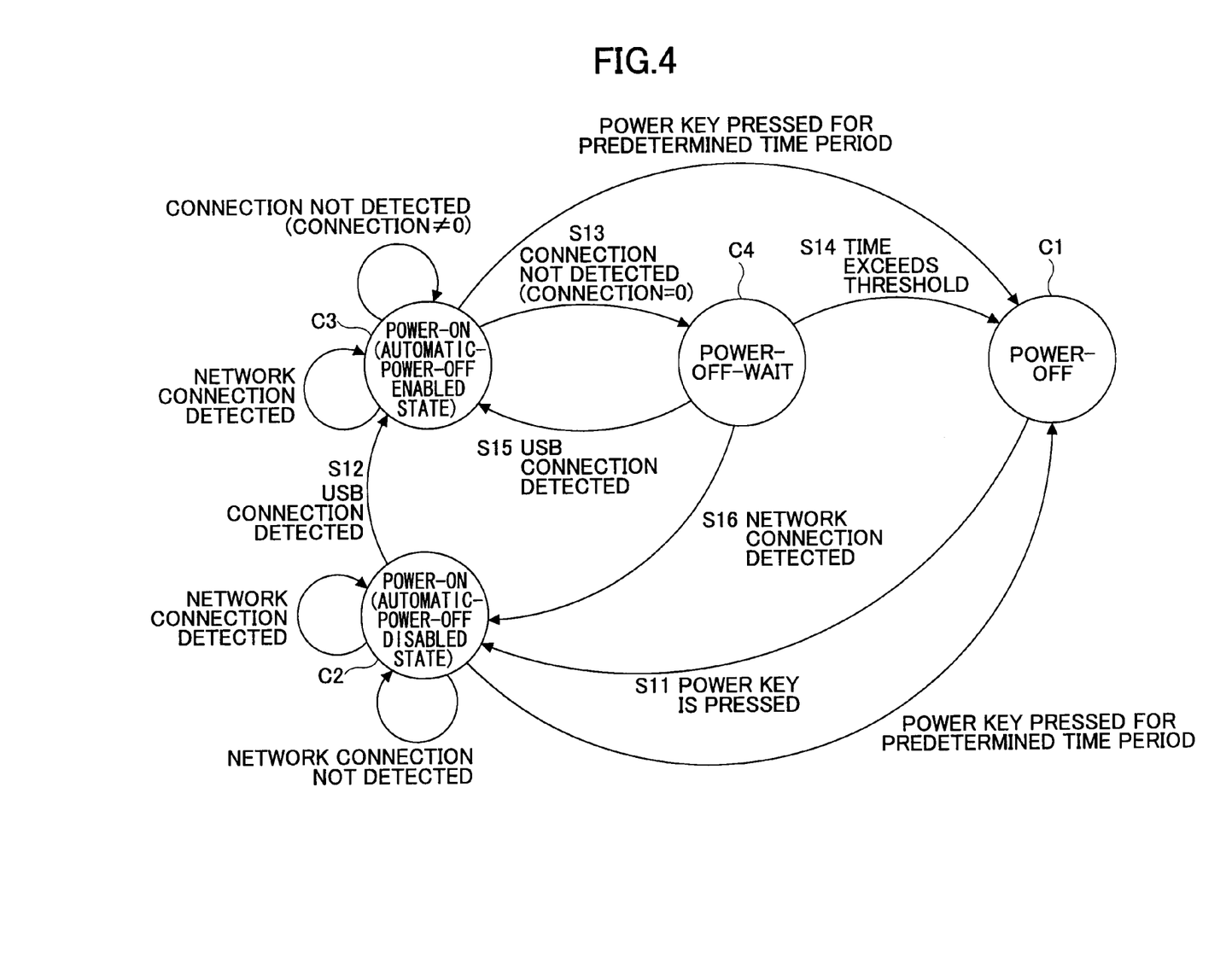
FIG. 4 is a state transition diagram used to describe a power control process in an inkjet recording apparatus according to an embodiment of the present invention.

FIG. 4 is a state transition diagram used to describe a power control process in the inkjet recording apparatus (image forming apparatus) 10 according to an embodiment of the present invention.

When a power key of the image forming apparatus 10 in a power-off state (C1) is pressed (S11), the image forming apparatus 10 goes into a power-on state (C2). In the power-on state (C2) (hereafter called an automatic-power-off disabled state), the image forming apparatus 10 is not automatically turned off even if no host 90 is connected via an Ethernet network (no network connection is detected). When the connection of a host 90 to a USB interface (USB connection) is detected by the first detection unit (S12), the image forming apparatus 10 goes into a power-on state (C3) (hereafter called an automatic-power-off enabled state) where it can be automatically turned off if a predetermined connection condition is met.

In the automatic-power-off enabled state (C3), if USB and network connections are not detected by the first detection unit and the second detection unit (S13), i.e., if the number of connections becomes zero (connection=0), the image forming apparatus 10 goes into a power-off-wait state (C4). In the power-off-wait state (C4), the image forming apparatus 10 is turned off if a predetermined condition is met. If the time elapsed after the number of connections becomes zero (connection=0) exceeds a threshold (S14), the power control unit turns off the power to at least a part the image forming apparatus 10 and the image forming apparatus 10 goes into the power-off state (C1).

Below, the above process of controlling the power of the image forming apparatus 10 based on the connection statuses of external devices (hosts 90) is described from the point of view of the power control unit.

When the image forming apparatus 10 is in the automatic-power-off disabled state (C2) immediately after it is turned on, the power control unit cannot turn off the power of the image forming apparatus 10 based on the connection statuses of the first communication unit (e.g., an USB interface) and the second communication unit (e.g., an Ethernet interface). In the automatic-power-off disabled state (C2), the power of the image forming apparatus 10 can be turned off only by a normal method (e.g., by pressing the power key for a predetermined time period).

When the first detection unit detects a USB connection (S12) while the image forming apparatus 10 is in the automatic-power-off disabled state (C2), the image forming apparatus 10 goes into the automatic-power-off enabled state (C3). In the automatic-power-off enabled state (C3), the power control unit can turn off the power of the image forming apparatus 10 if no connection is detected. Specifically, the power control unit monitors the connection statuses of the first and second communication units via the first and second detection units and maintains the image forming apparatus 10 in the automatic-power-off enabled state (C3) while at least one of the first and second communication units is connected to an external device (host 90). Meanwhile, if no connection is detected by the first and second detection units (S13), i.e., if no external device is connected to the first and second communication units (connection=0), the power control unit causes the image forming apparatus 10 to go into the power-off-wait state (C4).

If the time elapsed after the image forming apparatus 10 goes into the power-off-wait state (C4) exceeds a threshold (S14), the power control unit turns off the power to at least a part of the image forming apparatus 10 and the image forming apparatus 10 goes into the power-off state (C1). The threshold may be a predetermined fixed value or may be set by a user. For example, the image forming apparatus 10 may be configured to go from the automatic-power-off-enabled state (C3) directly into the power-off state (C1) without going through the power-off-wait state (C4) when the threshold is set at 0.

If a connection to at least one of the first and second communication units is detected before the time elapsed exceeds the threshold, the image forming apparatus 10 goes into the automatic-power-off-enabled state (C3) or the automatic-power-off-disabled state (C2) and the power control unit stops turning off the power. For example, if the first detection unit detects a USB connection before the time elapsed exceeds the threshold (S15), the power control unit causes the image forming apparatus 10 to go into the automatic-power-off enabled state (C3). If the second detection unit detects a network connection before the time elapsed exceeds the threshold (S16), the power control unit causes the image forming apparatus 10 to go into the automatic-power-off disabled state (C2).

The image forming apparatus 10 also goes into the power-off state (C1) when it is turned off by a normal method (e.g., by pressing the power key for a predetermined time period).

The connection statuses of the USB and Ethernet interfaces can be detected based on the voltage of a VBUS signal and the establishment of a link as described above. In this embodiment, it is assumed that the image forming apparatus 10 is turned on with the power key. However, any method or means may be used to turn on the image forming apparatus 10. In the above example, the power-off state indicates that the power to the entire image forming apparatus 10 is turned off. Alternatively, if an image forming apparatus is configured such that power supply to its modules can be controlled individually, the power-off state may indicate that the power to a part of the modules is turned off as in a sleep mode.

In this embodiment, it is assumed that USB and Ethernet interfaces are used as the first and second communication units. However, this embodiment may also be applied to a case where other types of communication interfaces are used. For example, instead of a USB interface, an interface conforming to IEEE 1394, IrDA, WirelessUSB, or Bluetooth may be used as the first communication unit. A connection via an IEEE 1394 interface can be detected in substantially the same manner as in the case of a USB interface because both of them provide wired communications. Meanwhile, connections via IrDA, WirelessUSB, and Bluetooth interfaces for wireless communications may be detected based on whether logical connections (links) are established. When a wireless communication interface is used as the first communication unit, it is preferable not to turn off at least a communication module instead of turning off the power to all the modules of the image forming apparatus 10. As the second detection unit, for example, a wireless LAN interface or a PLC interface may be used instead of an Ethernet (registered trademark) interface. Connections via wireless LAN and PLC interfaces may be also be detected based on whether links are established.

Thus, the above embodiment makes it possible to control power of an image forming apparatus (electronic apparatus) based on connection statuses of multiple communication units (communication interfaces). In other words, the above embodiment makes it possible to automatically turn off the power of an image forming apparatus only when all (or a group of) users (host devices) are not using the image forming apparatus. Automatically turning off the power to an image forming apparatus when it is not in use makes it possible to reduce power consumption and to save the user the trouble of having to press the power key of the image forming apparatus. Also in the above embodiment, the power to an image forming apparatus is not turned off based solely on the connection status of one user (host device). This configuration makes it possible to save other users the trouble of having to turn on the image forming apparatus again.

Figure 5:
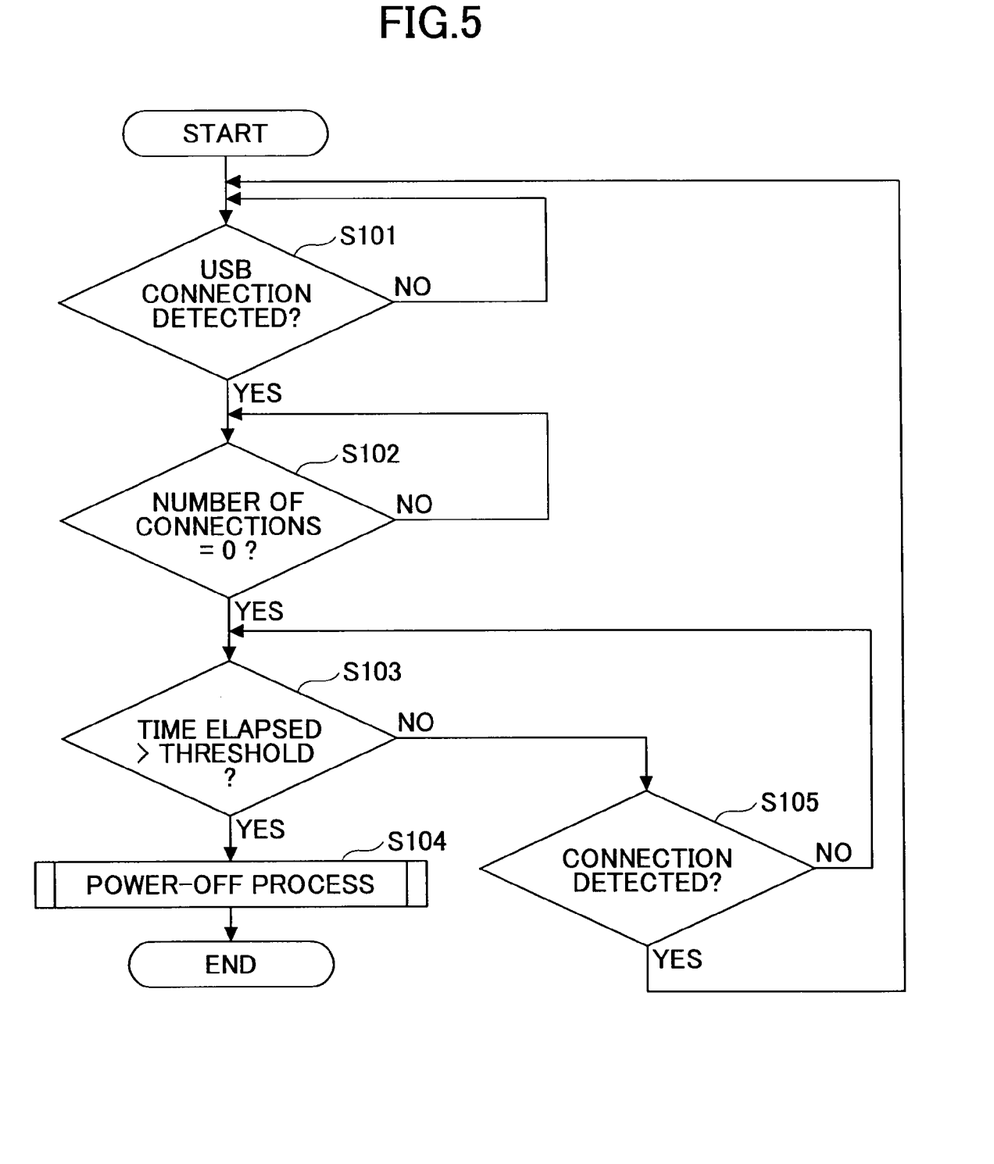
FIG. 5 is a flowchart showing an exemplary power control process in an inkjet recording apparatus according to an embodiment of the present invention.

FIG. 5 is a flowchart showing an exemplary power control process in the inkjet recording apparatus (image forming apparatus) 10 according to an embodiment of the present invention.

FIG. 5 mainly shows a process performed in the automatic-power-off disabled state (C2) and the automatic-power-off enabled state (C3) shown in FIG. 4 after the power of the image forming apparatus 10 is turned on.

After the image forming apparatus 10 is turned on, the first detection unit determines the connection status of a USB interface (S101). If no external device is connected to the USB interface (NO in S101), step S101 is repeated. In other words, the remaining process is not performed until the first detection unit detects a USB connection after the image forming apparatus 10 is turned on.

As described above, the image forming apparatus 10 is connected to an Ethernet network. Therefore, when there is a possibility that other users use the image forming apparatus 10 via the Ethernet network, it is preferable not to turn off the image forming apparatus 10. In this embodiment, if no external device is connected to the USB interface from when the image forming apparatus 10 has been turned on and if the image forming apparatus 10 is connected to the Ethernet network, it is assumed that the image forming apparatus 10 is basically used by multiple users. In this case, the image forming apparatus 10 is not automatically turned off.

Meanwhile, once a USB connection is detected after the power is turned on (YES in S101), the power control unit starts to monitor connection statuses of the first and second communication units via the first and second detection units and determines whether the number of connections is zero (S102). If one or more connections are detected (NO in S102), step S102 is repeated.

If no connection is detected, i.e., the number of connections is zero (YES in S102), the power control unit determines whether the time elapsed after the number of connections becomes zero has exceeded a threshold (S103). If the time elapsed has exceeded the threshold (YES in S103), the power control unit performs a power-off process to turn off the image forming apparatus 10 (S104). Thus, in this embodiment, if the number of connections is zero for a predetermined time period, it is determined that the image forming apparatus 10 is not being used and the image forming apparatus 10 is turned off to reduce the power consumption.

On the other hand, if the first and second detection units detect one or more connections (YES in S105) before the time elapsed exceeds the threshold (NO in S103), the process returns to step S101 of detecting the connection status of the USB interface. Thus, in this embodiment, if any connection is detected before the power-off process (of turning off the power to at least a part of the image forming apparatus 10 if no connection to the first and second communication units is detected) is performed, the power-off process is canceled. This configuration makes it possible to prevent the image forming apparatus 10 from being turned off unnecessarily when, for example, a network cable is pulled out by mistake, a problem such as a contact failure occurs, or a cable is temporarily pulled out by the user for a certain purpose.

The threshold in the above process may be a predetermined fixed value or may be set by the user. If it is not necessary to prevent the image forming apparatus 10 from being turned off unnecessarily as described above, the threshold may be set at zero.

Figure 6:
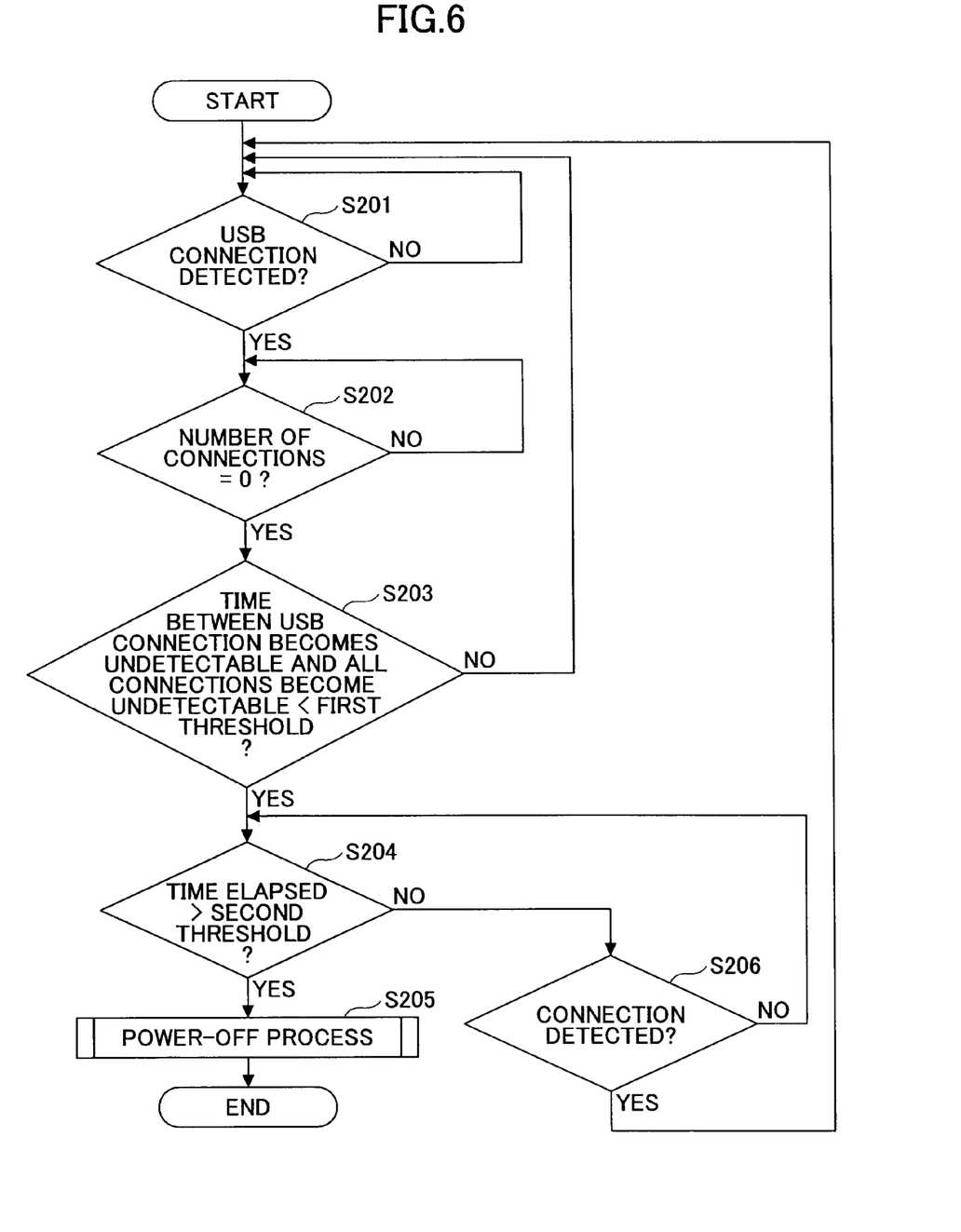
FIG. 6 is a flowchart showing another exemplary power control process in an inkjet recording apparatus according to an embodiment of the present invention.

FIG. 6 is a flowchart showing another exemplary power control process in the inkjet recording apparatus (image forming apparatus) 10 according to an embodiment of the present invention.

FIG. 6 shows a process similar to that shown in FIG. 5 but includes an additional step S203 after step S202 of determining whether the number of connections is zero. In step S203, it is determined whether the time period from when the connection to the USB interface becomes undetectable to when the connections to all communication interfaces (the USB interface and the Ethernet interface) become undetectable is less than a first threshold.

In FIG. 6, after the image forming apparatus 10 is turned on, the first detection unit determines the connection status of a USB interface (S201). If no external device is connected to the USB interface (NO in S201), step S201 is repeated.

Meanwhile, once a USB connection is detected after the power is turned on (YES in S201), the power control unit starts to monitor connection statuses of the first and second communication units via the first and second detection units and determines whether the number of connections is zero (S202). If one or more connections are detected (NO in S202, number of connections≠0), step S202 is repeated.

If no connection is detected, i.e., the number of connections is zero (YES in S202), the power control unit determines whether the time period from when the connection to the USB interface has become undetectable to when the connections to all communication interfaces have become undetectable is less than a first threshold (predetermined time period) (S203). If the time period is greater than or equal to the first threshold (NO in S203), the process returns to step S201 of detecting the connection status of the USB interface.

If the time period is less than the threshold 1 (YES in S203), the power control unit determines whether the time elapsed after the number of connections becomes zero is greater than a second threshold (S204). If the time elapsed is greater than the second threshold (YES in S204), the power control unit performs a power-off process to turn off the image forming apparatus 10 (S205). On the other hand, if the first and second detection units detect one or more connections (YES in S206) before the time elapsed exceeds the second threshold (NO in S204), the process returns to step S201 to detect the connection status of the USB interface.

There is a case where only the USB interface is used first after the power is turned on and only the Ethernet (network) interface is used thereafter. In this case, with the exemplary power control process shown in FIG. 5, the image forming apparatus 10 is turned off once the Ethernet connection becomes undetectable regardless of the previous network use status. The exemplary power control process shown in FIG. 6 may be used when it is desirable not to turn off the image forming apparatus 10 as frequently as in FIG. 5 so that the image forming apparatus 10 is more readily available for users (external devices) connected via the network. In FIG. 6, the process returns to the first step (S201) if the time period during which only a communication interface (in this example, the Ethernet interface) other than the USB interface is used is greater than or equal to the first threshold. This configuration makes it possible to improve the usability of the image forming apparatus 10 for network users while providing the advantages as described above. This may also be achieved by allowing the user to select whether to perform a power control process as shown in FIGS. 4 through 6. The first threshold may be a predetermined fixed value or may be set by the user.

The above embodiments may also be applied to a storage medium containing program code for causing the inkjet recording apparatus 10 shown in FIG. 1 to perform a power control method as described above.

More specifically, an embodiment of the present invention provides a storage medium containing program code for causing an electronic apparatus (image forming apparatus (inkjet recording apparatus) 10) to perform a power control method. The electronic apparatus includes a first communication unit (host I/F 106) for connecting the electronic apparatus and an external device (host 90) in a one-to-one relationship for data communications, a second communication unit (host I/F 106) for connecting the electronic apparatus and one or more other external devices (hosts 90) via a network for data communications, a first detection unit (control unit 100) for detecting a connection status of the first communication unit, a second detection unit (control unit 100) for detecting a connection status of the second communication unit, and a power control unit for controlling power to the electronic apparatus. The power control method includes the steps of determining, by the first detection unit, the connection status of the first communication unit when the electronic apparatus is turned on; monitoring, by the power control unit, the connection statuses of the first communication unit and the second communication unit via the first detection unit and the second detection unit after a connection to the first communication unit is detected by the first detection unit; and keeping, by the power control unit, the electronic apparatus turned on while a connection to at least one of the first communication unit and the second communication unit is detected.

The power control method preferably includes the step of turning off, by the power control unit, the power to at least a part of the electronic apparatus if connections to both the first communication unit and the second communication unit become undetectable after an initial connection to the first communication unit is detected by the first detection unit after the electronic apparatus is turned on.

In the power control method, the power to at least a part of the electronic apparatus is turned off by the power control unit if time elapsed after the connections to both the first communication unit and the second communication unit become undetectable exceeds a threshold. The power control method preferably includes the step of, if a connection to at least one of the first communication unit and the second communication unit is detected before the time elapsed exceeds the threshold, cancelling, by the power control unit, a control condition that the power to at least a part of the electronic apparatus is turned off if the connections to both the first communication unit and the second communication unit become undetectable. The power control method preferably includes the step of, if a connection to at least one of the first communication unit and the second communication unit is detected before the time elapsed exceeds the threshold, returning to the initial step of determining, by the first detection unit, the connection status of the first communication unit.

The power control method preferably includes the step of, if the connections to both the first communication unit and the second communication unit become undetectable after the initial connection to the first communication unit is detected by the first detection unit after the electronic apparatus is turned on and if a time period from when the connection to the first communication unit has become undetectable to when the connection to the second communication unit has become undetectable is greater than or equal to a predetermined time period, returning to the initial step of determining, by the first detection unit, the connection status of the first communication unit.

The first communication unit is implemented, for example, by a USB interface. The electronic apparatus may include an image forming unit for forming an image according to data input from any one of the external devices.

Aspects of the present invention provide an electronic apparatus that includes multiple communication units for connecting the electronic apparatus to external devices such as host computers and is capable of performing a power control process according to connection statuses of the communication units; and a storage medium containing program code for causing the electronic apparatus to perform the power control process.

According to an embodiment of the present invention, an electronic apparatus includes a first communication unit and a second communication unit, and the power to the electronic apparatus is controlled based on connection statuses of both the first and second communication units. The electronic apparatus is not turned off even if no external device is connected to the first communication unit as long as any external device is connected to the second communication unit. In other words, the electronic apparatus is turned off only when connections to the first and second communication units become undetectable. This configuration makes it possible to allow users connected to the electronic apparatus via the second communication unit to continue using the electronic apparatus even when no external device is connected to the first communication unit. This in turn makes it possible to save the users the trouble of having to press the power key of the electronic apparatus while reducing power consumption of the electronic apparatus when it is not in use.

The present invention is not limited to the specifically disclosed embodiments, and variations and modifications may be made without departing from the scope of the present invention.

The present application is based on Japanese Priority Application No. 2008-065594, filed on Mar. 14, 2008, the entire contents of which are hereby incorporated herein by reference.

What is claimed is:

1. An electronic apparatus, comprising:
   a first communication unit configured to connect the electronic apparatus and an external device in a one-to-one relationship for data communications;
   a second communication unit configured to connect the electronic apparatus and one or more other external devices via a network for data communications;

a first detection unit configured to detect a connection status of the first communication unit;
a second detection unit configured to detect a connection status of the second communication unit; and
a power control unit configured to control power to the electronic apparatus,
wherein
the first detection unit is configured to determine the connection status of the first communication unit when the electronic apparatus is turned on,
the power control unit is configured to monitor the connection statuses of the first communication unit and the second communication unit via the first detection unit and the second detection unit after the first detection unit detects a connection to the first communication unit and to keep the electronic apparatus turned on while a connection to at least one of the first communication unit and the second communication unit is detected, and
if connections to both the first communication unit and the second communication unit become undetectable after an initial connection to the first communication unit is detected by the first detection unit after the electronic apparatus is turned on and if a time period from when the connection to the first communication unit has become undetectable to when the connection to the second communication unit has become undetectable is greater than or equal to a predetermined time period, the power control unit is configured to return to an initial state where the power control unit waits until the first detection unit detects a connection to the first communication unit.

2. The electronic apparatus as claimed in claim 1, wherein the power control unit is configured to turn off the power to at least a part of the electronic apparatus if the connections to both the first communication unit and the second communication unit become undetectable after the initial connection to the first communication unit is detected by the first detection unit after the electronic apparatus is turned on.

3. The electronic apparatus as claimed in claim 2, wherein the power control unit is configured to turn off the power to at least a part of the electronic apparatus if time elapsed after the connections to both the first communication unit and the second communication unit become undetectable exceeds a threshold.

4. The electronic apparatus as claimed in claim 3, wherein if a connection to at least one of the first communication unit and the second communication unit is detected before the time elapsed exceeds the threshold, the power control unit is configured to cancel a control condition that the power to at least a part of the electronic apparatus is turned off if the connections to both the first communication unit and the second communication unit become undetectable.

5. The electronic apparatus as claimed in claim 3, wherein if a connection to at least one of the first communication unit and the second communication unit is detected before the time elapsed exceeds the threshold, the power control unit is configured to return to an initial state where the power control unit waits until the first detection unit detects a connection to the first communication unit.

6. The electronic apparatus as claimed in claim 1, wherein the first communication unit is a USB interface.

7. The electronic apparatus as claimed in claim 1, further comprising:
an image forming unit configured to form an image according to data input from any one of the external devices.

8. A storage medium having program code embodied therein for causing an electronic apparatus to perform a power control method,
the electronic apparatus including
a first communication unit configured to connect the electronic apparatus and an external device in a one-to-one relationship for data communications,
a second communication unit configured to connect the electronic apparatus and one or more other external devices via a network for data communications,
a first detection unit configured to detect a connection status of the first communication unit,
a second detection unit configured to detect a connection status of the second communication unit, and
a power control unit configured to control power to the electronic apparatus,
the power control method comprising the steps of:
determining, by the first detection unit, the connection status of the first communication unit when the electronic apparatus is turned on;
monitoring, by the power control unit, the connection statuses of the first communication unit and the second communication unit via the first detection unit and the second detection unit after a connection to the first communication unit is detected by the first detection unit;
keeping, by the power control unit, the electronic apparatus turned on while a connection to at least one of the first communication unit and the second communication unit is detected; and
if connections to both the first communication unit and the second communication unit become undetectable after an initial connection to the first communication unit is detected by the first detection unit after the electronic apparatus is turned on and if a time period from when the connection to the first communication unit has become undetectable to when the connection to the second communication unit has become undetectable is greater than or equal to a predetermined time period, returning to the initial step of determining, by the first detection unit, the connection status of the first communication unit.

9. The storage medium as claimed in claim 8, wherein the power control method further comprises the step of:
turning off, by the power control unit, the power to at least a part of the electronic apparatus if the connections to both the first communication unit and the second communication unit become undetectable after the initial connection to the first communication unit is detected by the first detection unit after the electronic apparatus is turned on.

10. The storage medium as claimed in claim 9, wherein the power to at least a part of the electronic apparatus is turned off by the power control unit if time elapsed after the connections to both the first communication unit and the second communication unit become undetectable exceeds a threshold.

11. The storage medium as claimed in claim 10, wherein the power control method further comprises the step of:
if a connection to at least one of the first communication unit and the second communication unit is detected before the time elapsed exceeds the threshold, cancelling, by the power control unit, a control condition that the power to at least a part of the electronic apparatus is turned off if the connections to both the first communication unit and the second communication unit become undetectable.

12. The storage medium as claimed in claim 10, wherein the power control method further comprises the step of:
if a connection to at least one of the first communication unit and the second communication unit is detected before the time elapsed exceeds the threshold, returning to the initial step of determining, by the first detection unit, the connection status of the first communication unit.

13. The storage medium as claimed in claim 8, wherein the first communication unit is a USB interface.

14. The storage medium as claimed in claim 8, wherein the electronic apparatus further includes an image forming unit configured to form an image according to data input from any one of the external devices.

* * * * *